(12) United States Patent
Mathiowetz

(10) Patent No.: US 8,874,402 B2
(45) Date of Patent: Oct. 28, 2014

(54) PHYSICAL MEMORY HANDLING FOR HANDHELD FIELD MAINTENANCE TOOLS

(75) Inventor: Brad N. Mathiowetz, Lakeville, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 2171 days.

(21) Appl. No.: 10/439,764

(22) Filed: May 16, 2003

(65) Prior Publication Data

US 2004/0228184 A1 Nov. 18, 2004

(51) Int. Cl.
*G06F 15/00* (2006.01)
*G06F 1/16* (2006.01)

(52) U.S. Cl.
CPC ............ G06F 1/1656 (2013.01); G06F 1/1626 (2013.01)
USPC ............ 702/127; 702/182; 702/183; 702/184

(58) Field of Classification Search
CPC ..................................................... G06F 1/1626
USPC ............................ 702/127, 184–189; 710/301
See application file for complete search history.

(56) References Cited

U.S. PATENT DOCUMENTS

| | | | |
|---|---|---|---|
| 3,955,132 A | 5/1976 | Greenwood | 323/15 |
| 4,337,516 A | 6/1982 | Murphy et al. | 364/551 |
| 4,630,265 A | 12/1986 | Sexton | 370/86 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,426,774 A | 6/1995 | Banerjee et al. | 395/575 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,570,300 A | 10/1996 | Henry et al. | 364/551.01 |

(Continued)

FOREIGN PATENT DOCUMENTS

DE 29917651 12/2000
DE 1993 0660 A1 1/2001

(Continued)

OTHER PUBLICATIONS

U.S. Appl. No. 09/384,876, filed Aug. 27, 1999, Eryurek et al.

(Continued)

*Primary Examiner* — Phuong Huynh
(74) *Attorney, Agent, or Firm* — Christopher R. Christenson; Kelly, Holt & Christenson, PLLC

(57) ABSTRACT

Removable memory card handling for handheld field maintenance devices is provided. In one aspect, a memory card is attached to an extension tab that is larger than the card to facilitate handling and provide a larger printable surface than the card. In another aspect, a removable memory module includes a memory card permanently affixed therein. The removable module includes a locking mechanism to lock the module into the tool to maintain the environmental rating of the tool.

10 Claims, 3 Drawing Sheets

(56) References Cited

U.S. PATENT DOCUMENTS

| | | | |
|---|---|---|---|
| 5,573,032 A | 11/1996 | Lenz et al. | 137/486 |
| 5,598,521 A | 1/1997 | Kilgore et al. | 395/326 |
| 5,623,605 A | 4/1997 | Keshav et al. | 395/200.17 |
| 5,665,899 A | 9/1997 | Willcox | 73/1.63 |
| 5,742,845 A | 4/1998 | Wagner | 395/831 |
| 5,752,249 A | 5/1998 | Macon, Jr. et al. | 707/103 |
| 5,764,891 A | 6/1998 | Warrior | 395/200.2 |
| 5,793,963 A | 8/1998 | Tapperson et al. | 395/200.31 |
| 5,828,567 A | 10/1998 | Eryurek et al. | 364/184 |
| 5,838,187 A | 11/1998 | Embree | 327/512 |
| 5,903,455 A | 5/1999 | Sharpe et al. | 700/83 |
| 5,909,368 A | 6/1999 | Nixon et al. | 364/131 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A | 9/1999 | Sharpe, Jr. et al. | 395/835 |
| 5,970,430 A | 10/1999 | Burns et al. | 702/122 |
| 5,980,078 A | 11/1999 | Krivoshein et al. | 364/131 |
| 5,995,916 A | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,091,968 A | 7/2000 | Koohgoli et al. | 455/557 |
| 6,094,600 A | 7/2000 | Sharpe, Jr. et al. | 700/19 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,195,591 B1 | 2/2001 | Nixon et al. | 700/83 |
| 6,211,623 B1 | 4/2001 | Wilhelm et al. | 315/224 |
| 6,236,334 B1 | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,298,377 B1 | 10/2001 | Hartikainen et al. | 709/223 |
| 6,304,934 B1 | 10/2001 | Pimenta et al. | 710/129 |
| 6,307,483 B1 | 10/2001 | Westfield et al. | 340/870.11 |
| 6,317,701 B1 | 11/2001 | Pyotsia et al. | 702/188 |
| 6,324,607 B1 | 11/2001 | Korowitz et al. | 710/102 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,386,456 B1* | 5/2002 | Chen et al. | 235/487 |
| 6,397,114 B1 | 5/2002 | Eryurek et al. | 700/51 |
| 6,434,504 B1 | 8/2002 | Eryurek et al. | 702/130 |
| 6,444,350 B1 | 9/2002 | Toya et al. | 429/90 |
| 6,449,574 B1 | 9/2002 | Eryurek et al. | 702/99 |
| 6,473,710 B1 | 10/2002 | Eryurek | 702/133 |
| 6,487,462 B1 | 11/2002 | Reeves | 700/73 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,539,384 B1 | 3/2003 | Zellner et al. | 707/10 |
| 6,594,603 B1 | 7/2003 | Eryurek et al. | 702/104 |
| 6,594,621 B1 | 7/2003 | Meeker | 702/185 |
| 6,598,828 B2 | 7/2003 | Fiebick et al. | 244/118.1 |
| 6,601,005 B1 | 7/2003 | Kavaklioglu et al. | 702/104 |
| 6,611,775 B1 | 8/2003 | Coursolle et al. | 702/65 |
| 6,615,149 B1 | 9/2003 | Wehrs | 702/76 |
| 6,629,059 B2 | 9/2003 | Borgeson et al. | 702/183 |
| 6,654,697 B1 | 11/2003 | Eryurek et al. | 702/47 |
| 6,697,681 B1 | 2/2004 | Stoddard et al. | 700/17 |
| 6,714,969 B1 | 3/2004 | Klein et al. | 709/219 |
| 6,775,271 B1 | 8/2004 | Johnson et al. | 370/352 |
| 6,970,359 B2* | 11/2005 | Gochnour et al. | 361/737 |
| 6,993,664 B2 | 1/2006 | Padole et al. | 713/200 |
| 2001/0053065 A1 | 12/2001 | Cudini et al. | 361/728 |
| 2002/0004370 A1 | 1/2002 | Stengele et al. | |
| 2002/0065631 A1 | 5/2002 | Loechner | |
| 2002/0077711 A1 | 6/2002 | Nixon et al. | |
| 2002/0078297 A1* | 6/2002 | Toyama et al. | 711/115 |
| 2002/0116540 A1 | 8/2002 | Maeda et al. | 709/317 |
| 2002/0123864 A1 | 9/2002 | Eryurek et al. | |
| 2003/0023408 A1 | 1/2003 | Wight et al. | |
| 2003/0023795 A1 | 1/2003 | Packwood et al. | |
| 2003/0033040 A1 | 2/2003 | Billings | 700/97 |
| 2003/0119568 A1 | 6/2003 | Menard | 455/572 |
| 2003/0158795 A1 | 8/2003 | Markham et al. | |
| 2003/0181074 A1* | 9/2003 | Liu | 439/67 |
| 2003/0204373 A1 | 10/2003 | Zielinski et al. | 702/184 |
| 2004/0148503 A1 | 7/2004 | Sidman | 713/167 |
| 2004/0172526 A1 | 9/2004 | Tann et al. | 713/2 |
| 2004/0225796 A1 | 11/2004 | Hanson et al. | 710/301 |
| 2004/0230327 A1 | 11/2004 | Opheim et al. | 700/83 |
| 2005/0036372 A1 | 2/2005 | Sasaki | 365/202 |
| 2006/0094466 A1 | 5/2006 | Tran | 455/558 |

FOREIGN PATENT DOCUMENTS

| | | |
|---|---|---|
| EP | 1022626 A2 | 7/2000 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/14855 | 4/1998 |
| WO | WO/98/39718 | 9/1998 |
| WO | WO/00/41050 | 7/2000 |
| WO | WO 00/55700 | 9/2000 |
| WO | WO/02/27418 | 4/2002 |

OTHER PUBLICATIONS

U.S. Appl. No. 09/409,098, filed Sep. 30, 1999, Eryurek et al.
U.S. Appl. No. 09/799,824, filed Mar. 5, 2001, Rome et al.
U.S. Appl. No. 09/852,102, filed May 9, 2001, Eryurek et al.
U.S. Appl. No. 09/855,179, filed May 14, 2001, Eryurek et al.
U.S. Appl. No. 10/790,627, filed Mar. 6, 2003, Mathiowetz.
U.S. Appl. No. 10/438,386, filed Mar. 1, 2004, Mathiowetz et al.
U.S. Appl. No. 10/440,047, filed May 16, 2003, Kantzes et al.
U.S. Appl. No. 10/426,894, filed Apr. 30, 2003, Duren et al.
U.S. Appl. No. 10/438,401, filed May 16, 2003, Opheim et al.
U.S. Appl. No. 10/440,434, filed May 16, 2003, DelaCruz et al.
U.S. Appl. No. 10/435,819, filed May 12, 2003, Kantzes et al.
U.S. Appl. No. 10/440,048, filed May 16, 2003, Duren et al.
U.S. Appl. No. 10/440,444, filed May 16, 2003, Mathiowetz et al.
U.S. Appl. No. 10/439,660, filed May 16, 2003, Mathiowetz et al.
U.S. Appl. No. 10/439,764, filed May 16, 2003, Mathiowetz.
U.S. Appl. No. 10/310,703, filed Dec. 5, 2002, Zielinski et al.
U.S. Appl. No. 10/440,041, filed May 16, 2003, Mathiowetz et al.
U.S. Appl. No. 10/440,441, filed May 16, 2003, Mathiowetz et al.
"Fluke 179 Multimeter & Toolpak Combo Pack"http://www.fluke.com/MULTIMETER/TOOLPAK .ASP?AGID=6&SID=260 (2 pages).
"Multifunction PDA Calibrator Transmation Model 3-PMF1," Transmation, Apr. 2001.
"AAPA 60 & 90 Series Multimeter," http://www.appatech.com/a-60new.htm (5 pages).
"Fieldbus Standard for Use in Industrial Control Systems Part 2: Physical Layer Specification and Service Definition", ISA-S50.02-1992, pp. 1-93.
Hart Communications, Technical Information, Part 4 Communications, Samson, Frankfurt.
"Fieldbus Brings Protocol to Process Control," Santori et al., IEEE Spectrum, vol. 33, Issue 3, Mar. 1996, pp. 60-64.
"Computerized Maintenance systems—an Overview of Two Basic Types for Field Devices," Medlin, IEEE Pulp and Pater Industry Technical Conference, Jun. 21-25, 1999, pp. 230-232.
"Fieldbus in the Process Control Laboratory—its Time has Come," Rehg. et al., ASEE/IEEE Frontiers in Education Conference, vol. 3, Nov. 1999, pp. 13B4/12-13B4/17.
"Generic Device Description for Complex HART Field Devices," Zulkifi et al., IEE 8th International Conference on Communication Systems, vol. 2, Nov. 25-28, 2002, pp. 646-650.
"SFC Smart Field Communicator—Model STS103," Honeywell, Specification, Dec. 1995, pp. 1-4.
"SFC Smart Field Communicator—Models SFC160/SFC260," Yamatake, Specification Apr. 1999, pp. 1-6.

(56) References Cited

OTHER PUBLICATIONS

"Hart Communicator," Fisher-Rosemount, Product Manual, Jul. 2000, pp. i-iv, ix-x, 1-1-1-40-2-1-2-8-3-1-3-38-A-1-A-6-B-1-B-6C-1-C-4-D-1-D-4 and I-1 1-2.

Shoji et al., Fieldbus System Engineering, 1999, Yokogawa Technical Report.

Diedrich et al., Field Device Integration in DCS Engineering Using a Device Model, 1998, IEEE.

Dewey, Fieldbus Device Maintenance—Do I Need to Go to the Field Anymore?, The Instrumentation, Systems and Automation Society, ISA 2000.

Simon et al., Field Devices—Models and Their Realizations, Dec. 11-14, 2002, Industrial Technology, IEEE ICIT 2002, IEEE International Conference, vol. 1, pp. 307-312.

"HART Communicator," Asset Management Solutions, Fisher-Rosemount, Bulletin 62.1: Communicator, Jan. 2001, pp. 1-7.

"Honeywell Introduces Pocket PC-based Toolkit for Configuring, Monitoring, Diagnosing, and Managing Smart Field Instruments," Oct. 21, 2002, Cyndi Bloom, Honeywell, 2 pages.

First Communication from Application No. 05826038.1, filed Nov. 9, 2005.

* cited by examiner

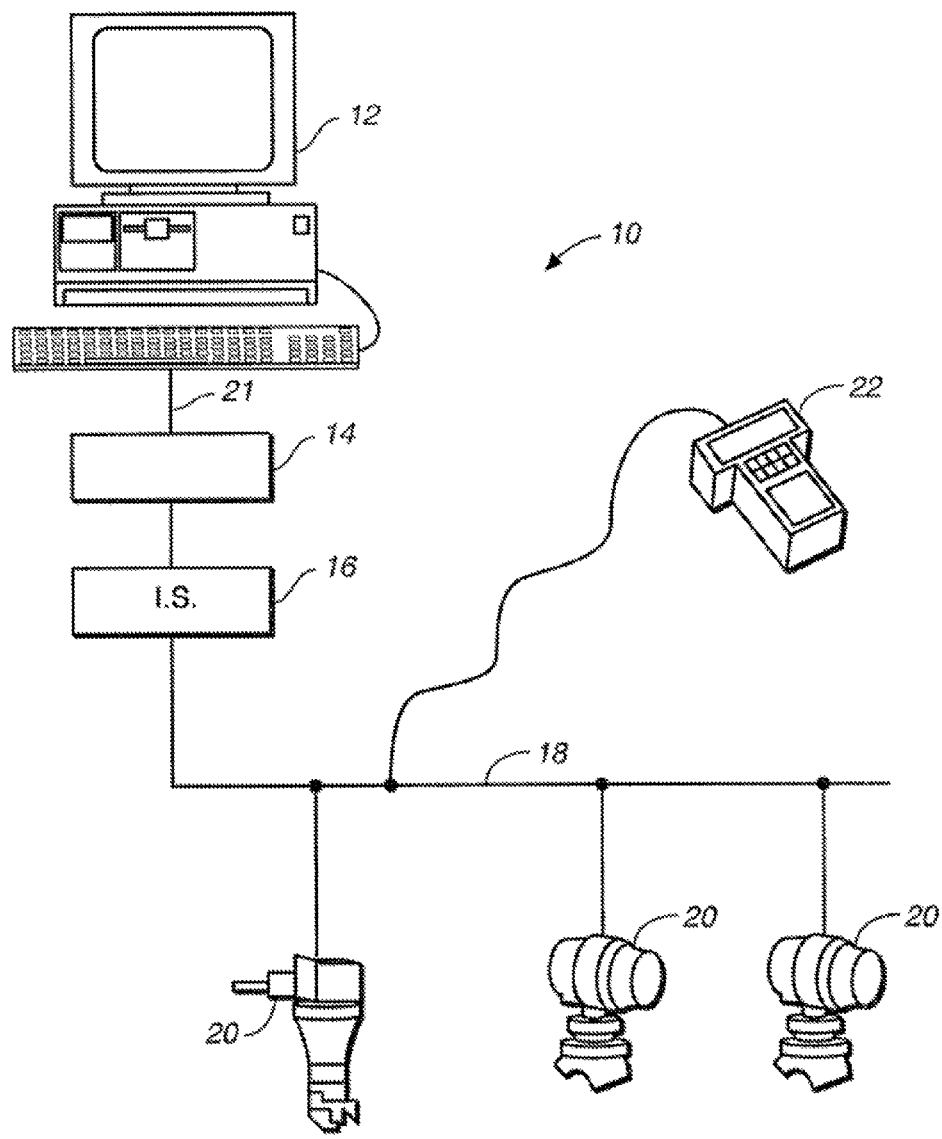
FIG._1

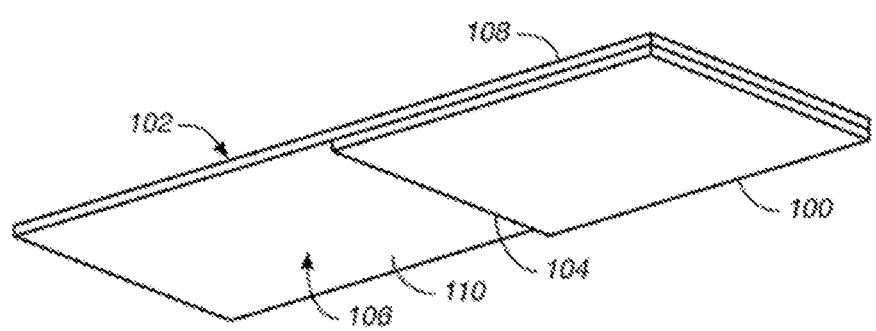
FIG._2
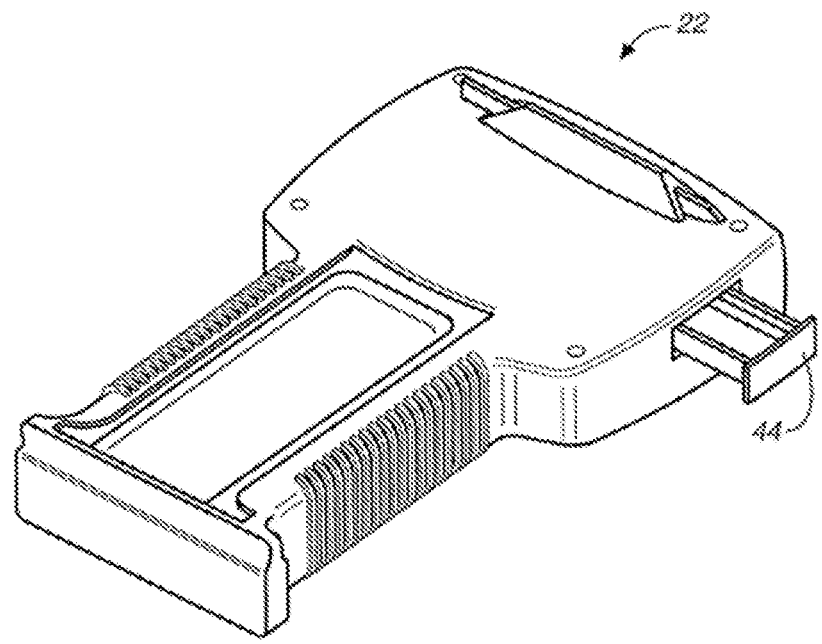
FIG._3

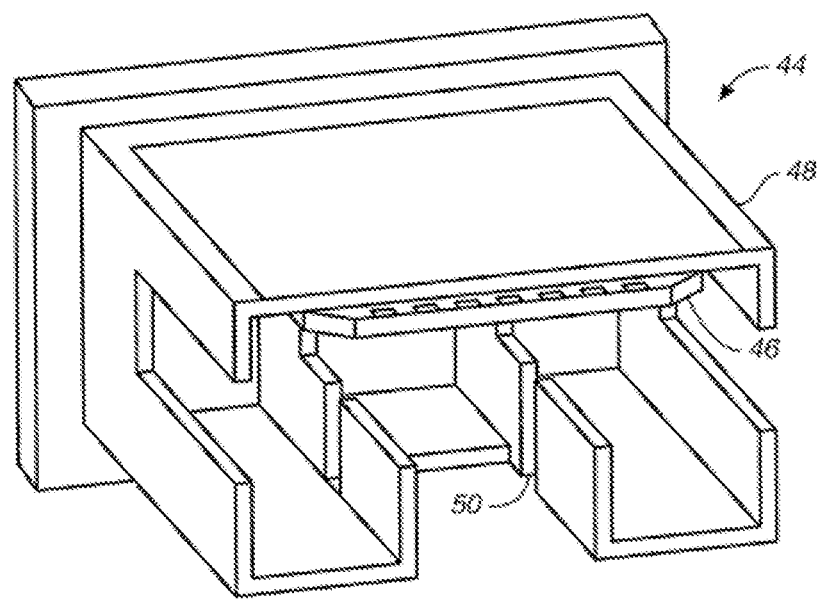
FIG._4
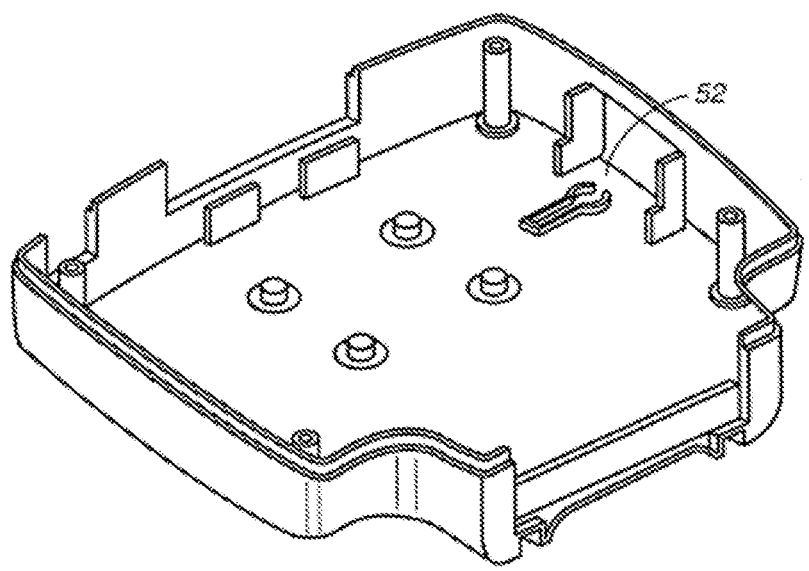
FIG._5

PHYSICAL MEMORY HANDLING FOR HANDHELD FIELD MAINTENANCE TOOLS

BACKGROUND OF THE INVENTION

Intrinsically safe field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe handheld field maintenance tool allows technicians to quickly diagnose such errors in the field.

One such device is sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance.

Intrinsic Safety requirements are intended to guarantee that instrument operation or failure cannot cause ignition if the instrument is properly installed in an environment that contains explosive gasses. This is accomplished by limiting the maximum energy stored in the transmitter in a worst case failure situation. Excessive energy discharge may lead to sparking or excessive heat which could ignite an explosive environment in which the transmitter may be operating.

Examples of intrinsic safety standards include European CENELEC standards EN50014 and 50020, Factory Mutual Standard FM3610, the Canadian Standard Association, the British Approval Service for Electrical Equipment in Flammable Atmospheres, the Japanese Industrial Standard, and the Standards Association of Australia.

In order to ensure stringent compliance with automation industry safety protocols and specifications, only equipment certified by an independent agency can be used in such locations. Any component of a handheld field maintenance tool which is removable must be replaced with another component that also satisfies all requisite safety requirements.

Another difficulty for modern intrinsically safe handheld field maintenance tools is that such tools can be provided with varying levels of functionality. Often times this functionality is controlled by software selections that are generated based upon a user purchasing specific groups of functionality. Since electric removable storage media usable with such devices is inherently portable, it is important to ensure that handling of these memory devices is performed in a manner that will not adversely affect the memory. Further, it is important to ensure that where the memory is removable from the handheld device, that even if there is no memory coupled to the handheld device, that intrinsic safety requirements can still be met.

SUMMARY OF THE INVENTION

Removable memory card handling for handheld field maintenance devices is provided. In one aspect, a memory card is attached to an extension tab that is larger than the card to facilitate handling and provide a larger printable surface than the card. In another aspect, a removable memory module includes a memory card permanently affixed therein. The removable module includes a locking mechanism to lock the module into the tool to maintain the environmental rating of the tool.

BRIEF DESCRIPTION OF THE DRAWINGS

FIG. 1 is a diagrammatic view of an industrial process control and measurement environment in which embodiments of the invention are useful.

FIG. 2 is a bottom perspective view of a memory card and handling tab in accordance with an embodiment of the present invention.

FIG. 3 is a bottom perspective view of a handheld field maintenance tool and removable memory module in accordance with an embodiment of the present invention.

FIG. 4 is a perspective view of a removable memory module containing a non-volatile electronic memory card in accordance with an embodiment of the present invention.

FIG. 5 is a top perspective view of the interior of a bottom portion of a handheld field maintenance tool in accordance with embodiments of the present invention.

DETAILED DESCRIPTION OF THE PREFERRED EMBODIMENTS

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled to process communication loop 18 in a multi-drop configuration. An alternative process communication (or process control) loop (not shown) is an HART® process communication loop. The HART® protocol operates using the frequency shift keying (FSK) principle, which is based on the Bell 202 communication standard. The digital signal is made up from two frequencies—1200 Hz and 2200 Hz, representing bits 1 and 0, respectively. HART® installations can be operated in so-called point-to-point configurations as well as multi-drop configurations.

FIG. 1 illustrates a multi-drop wiring configuration that vastly simplifies system wiring compared to other topologies such as the star topology. Multi-drop HART® configurations support a maximum of 15 devices, while multi-drop Fieldbus configurations support a maximum of 32 devices.

Handheld communication and diagnostic device 22 is coupled to loop 18 as illustrated in FIG. 1. It is appreciated that the example device describes a device 22 that is capable of connection to HART® or FOUNDATION™ Fieldbus loops but that device may be configured to connect to other protocols such as Profibus. When coupled to a process control loop as shown, device 22 can perform a number of the communication and diagnostic functions.

Much of the functionality of tool 22 is selected and/or purchased and subsequently embodied on one or more removable electronic memory cards. Examples of such cards include expansion memory cards, and removable memory modules such as described in U.S. patent application Ser. No. 10/310,703 entitled INTRINSICALLY SAFE FIELD MAINTENANCE TOOL, filed Dec. 5, 2002.

With respect to the expansion memory card, today's market continues to provide denser memory. This allows more memory capacity for a given size, or a smaller physical footprint for the same capacity. As the physical package size of the memory gets smaller, simply handing the memory can become difficult. This is especially so in the case where the memory card is mounted into a slot in such a protected manner that none, or virtually none of the memory card extends beyond the slot to facilitate removal and/or handling. Another challenge presented by ever smaller memory cards is that the amount of space available for marking is significantly limited. It is generally desirable to print the model number, part number, serial number, feature information, and/or instructions on the memory card. However, this is simple not possible on cards that are becoming the size of a postage stamp.

FIG. 2 is a bottom perspective view of expansion memory card 100 and handling tab 102 adhered thereto. Tab 102 extends beyond edge 104 of memory card 100. Extension region 106 allows a technician to grasp the tab/memory assembly for removal or installation. Additionally, the entire top portion 108 of tab 102, and the bottom portion 110 of extension region 106 provide printable area where important information can be provided. As illustrated, the tab is affixed to a defined portion of card 100. The tab can be applied by the card manufacturer, or by the manufacturer that is integrating the card into their product. In the latter case, this also gives the manufacturer an opportunity to personalize the assembly.

Preferably, extension region 106 does not include any adhesive material since it will be handled by the technician. Further, the material selection and thickness of tab 102 should be such that it is rugged enough for handling yet flexible enough so that it does not impair the ability to incorporate the assembly into a device. Preferably, the tab material is selected for its durability, flexibility and resistance to chemical attack. One example of a suitable material is sold under the trade designation "Premium Permanent" available from Protac. Another example is sold under the trade designation "3698E" available from 3M, of Saint Paul, Minn.

FIG. 3 is a bottom perspective view of a handheld field maintenance tool and removable memory module in accordance with an embodiment of the present invention. When tool 22 is used in an industrial environment, there is sometimes a need to use different software applications depending on the task at hand. This software selection can be accomplished by using one or more removable memory modules, such as module 44. The removable memory module will contain software that is executable by a processor within the handheld field maintenance tool. In this environment, it is important that the removable module have a form factor that prevents non-authorized memory cards from being used. Additionally, it is important that the environmental rating of the tool housing be maintained when the removable memory module is in place.

FIG. 4 is a perspective view of a removable memory module containing a non-volatile electronic memory card in accordance with an embodiment of the present invention. Module 44 preferably includes memory card 46 which is preferably a commercially-available memory card such as a Secure Digital memory card. However, any suitable type of electronic non-volatile memory cards can be used for module 44. Card 46 is selected by a manufacturer based upon physical form factor, memory capacity, and electrical characteristics such as current consumption. Memory card 46 is permanently mounted within polymeric housing 48. Additionally, it is possible to combine the package with the Identification Code such that the memory card will be useless if moved to another housing. One way that this can be accomplished is by requiring some unique identifier from the housing, such as a housing serial number, that is then used by an algorithm to generate the Identification Code file based not only on the unique serial number on the card, but the serial number of the housing as well. Then, when the module is inserted into a tool, the tool could require the user to enter the serial number of the housing for module verification/authentication.

Housing 48 is designed to have a size and shape such that it will only fit into a handheld field maintenance tool. Additionally, housing 48 includes features such as locking feature such as notch 50 that cooperates with associated feature 52 in the tool housing such that when module 44 is inserted sufficiently into the tool, that notch 50 will be engaged by feature 52. When installed, the module 44 is held thinly in place such that it cannot fall out during normal use. This helps maintain the environmental rating of the tool. It is appreciated that a variety of locking features (tabs, snaps, notches, etc.) may be utilized as long as the environmental rating of the tool is maintained and the module is easily removable by a technician.

The manner and degree to which card 46 is permanently mounted to housing 48 is such that when module 44 is removed from tool 22, card 46 will disengage electrically from tool 22 and be removed with module 44.

In some instances, it may be desirable to operate tool 22 without any additional memory card. In order to permit such operation and still comply with intrinsic safety requirements, blank housings 48 can be used. These housings do not include a memory card, such as card 46, but instead are simply used to fill the memory module aperture in tool 22. In blank housings, it is preferred that the location where a memory card would normally be mounted, be instead filled with a hard material such as a resin. This helps reduce the possibility that non-authorized memory cards would simply be mounted in blanks to create non-authorized memory modules.

Although the present invention has been described with reference to preferred embodiments, workers skilled in the art will recognize that changes may be made in form and detail without departing from the spirit and scope of the invention.

What is claimed is:

1. A removable memory module for a handheld field maintenance tool, the module comprising:
    a housing removably engageable with the tool;
    an electronic non-volatile memory card permanently affixed to the housing and disposed to electrically couple directly to the handheld field maintenance tool when the housing is engaged with the tool; and
    wherein the housing includes a locking mechanism to engage a cooperative feature of the handheld field maintenance tool to maintain the module within the handheld field maintenance tool.

2. The module of claim 1, wherein the locking mechanism is a notch.

3. The module of claim 1, wherein the electronic non-volatile memory card is a Secure Digital card.

4. The module of claim 1, wherein the removable memory module is securely engaged with the handheld field maintenance tool during normal operation of the tool such that the environmental rating of the tool is maintained.

5. A blank removable memory module for a handheld field maintenance tool, the module comprising:
    a housing removably engageable with the handheld field maintenance tool;

an electronic non-volatile memory card region filled with a hard material instead of an electronic non-volatile memory card, the hard material being permanently affixed to the housing; and wherein the housing includes a locking mechanism to engage a cooperative feature of the handheld field maintenance tool to maintain the module within the handheld field maintenance tool.

6. The module of claim 5, wherein the locking mechanism is a notch.

7. The module of claim 5, wherein the hard material is a resin.

8. The removable memory module of claim 1, wherein the housing has a unique identifier.

9. The removable memory module of claim 8, wherein the unique identifier is a serial number.

10. The removable memory module of claim 9, wherein the module is configured such that when the module is inserted into the tool, the tool requires the user to enter the serial number of the housing.

* * * * *